United States Patent
Lee

(10) Patent No.: US 10,516,358 B2
(45) Date of Patent: Dec. 24, 2019

(54) METHOD OF INTELLIGENTLY CONTROLLING POWER GENERATION BASED ON EFFICIENCY MAP AND VEHICLE USING THE SAME

(71) Applicants: Hyundai Motor Company, Seoul (KR); Kia Motors Corporation, Seoul (KR)

(72) Inventor: Jong-Won Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 72 days.

(21) Appl. No.: 15/617,200

(22) Filed: Jun. 8, 2017

(65) Prior Publication Data

US 2018/0083559 A1 Mar. 22, 2018

(30) Foreign Application Priority Data

Sep. 21, 2016 (KR) ........................ 10-2016-0120627

(51) Int. Cl.
*H02P 9/00* (2006.01)
*B60R 16/03* (2006.01)

(52) U.S. Cl.
CPC .......... *H02P 9/008* (2013.01); *B60R 16/0307* (2013.01); *B60Y 2300/60* (2013.01); *B60Y 2300/91* (2013.01)

(58) Field of Classification Search
None
See application file for complete search history.

(56) References Cited

U.S. PATENT DOCUMENTS

| | | | | |
|---|---|---|---|---|
| 7,459,801 B2* | 12/2008 | Shimoyama | .............. | H02P 9/48 290/40 B |
| 2012/0167605 A1* | 7/2012 | Ikemiya | .............. | B60H 1/3232 62/126 |
| 2013/0024179 A1* | 1/2013 | Mazzaro | .............. | G06Q 10/04 703/18 |
| 2015/0232082 A1* | 8/2015 | Frank | ................... | B60W 20/10 701/22 |
| 2016/0207541 A1* | 7/2016 | Mansur | .............. | F02D 41/1454 |

FOREIGN PATENT DOCUMENTS

| | | |
|---|---|---|
| KR | 10-2009-0039561 A | 4/2009 |
| KR | 20100063921 A | 6/2010 |
| KR | 10-2012-0116630 A | 10/2012 |
| KR | 10-2013-0015813 A | 2/2013 |
| KR | 10-2014-0062648 A | 5/2014 |
| KR | 10-2014-0077966 A | 6/2014 |
| KR | 10-1585586 B1 | 1/2016 |

* cited by examiner

*Primary Examiner* — Jonathan M Dager
*Assistant Examiner* — Garrett F Evans
(74) *Attorney, Agent, or Firm* — Morgan, Lewis & Bockius LLP

(57) ABSTRACT

A method of intelligently controlling power generation based on an efficiency map may include performing a power generation control selection mode in which voltage change speed control is performed based on a load map or a driving torque map of an alternator after power generation control of the alternator is performed by a controller while a vehicle travels.

14 Claims, 7 Drawing Sheets

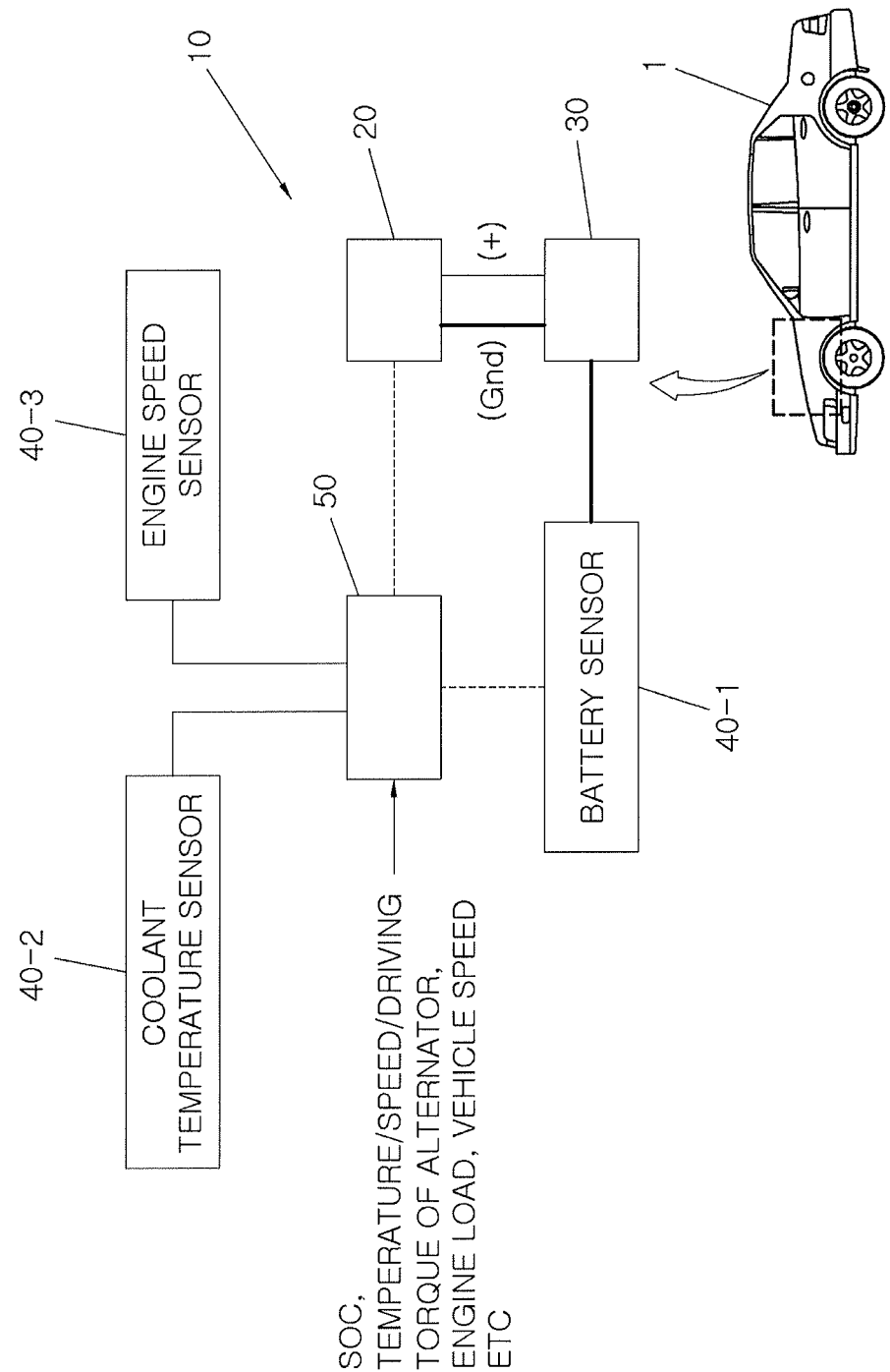

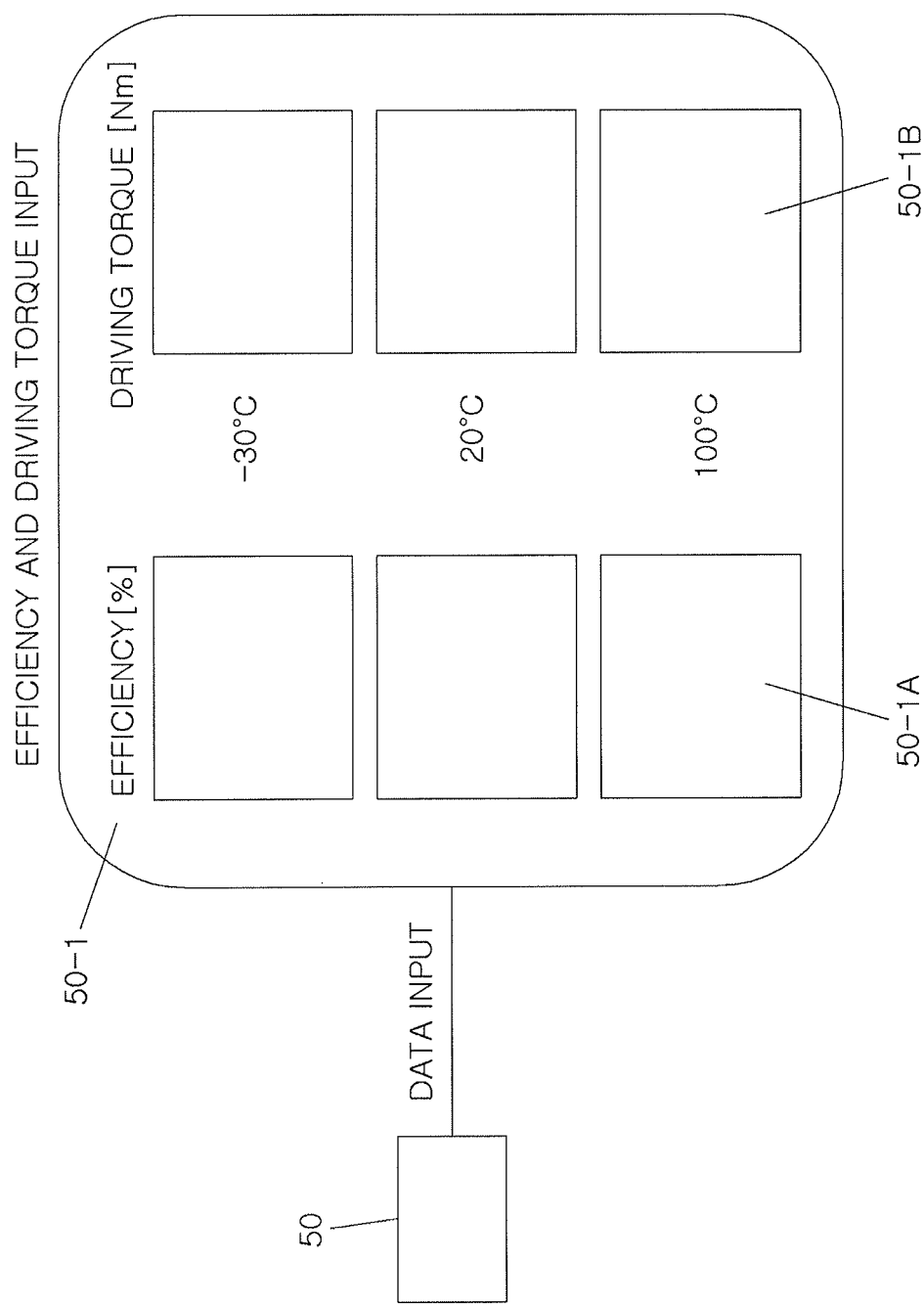

METHOD OF INTELLIGENTLY CONTROLLING POWER GENERATION BASED ON EFFICIENCY MAP AND VEHICLE USING THE SAME

CROSS-REFERENCE(S) TO RELATED APPLICATIONS

The present application claims priority to Korean Patent Application No. 10-2016-0120627, filed on Sep. 21, 2016, the entire contents of which is incorporated herein for all purposes by reference.

BACKGROUND OF THE INVENTION

Field of the Invention

Exemplary embodiments of the present invention relate to a power generation control method; and, particularly, to a method of intelligently controlling power generation based on an efficiency map, configured for further improving battery charge and discharge performance and fuel efficiency by correcting efficiency variations in alternators which are different for each manufacturer, model, and operation temperature, and a vehicle using the same.

Description of Related Art

In general, electric power for a vehicle is generated by an alternator and the power generation control of the alternator is performed based on voltage change speed control. Battery charge and discharge performance and fuel efficiency are improved by controlling the power generation of the alternator.

By way of example, the power generation control of the alternator is performed by determining the driving torque map of the alternator and controlling voltage change speed based on the driving torque map when the voltage of the alternator is changed.

Therefore, the power generation control of the alternator obtains battery charge and discharge performance by adjusting an output current according to the State of Charge (SOC) of a battery to prevent the start of an engine from malfunctioning due to the deterioration of the SOC of the battery. In addition, the power generation control of the alternator contributes to an improvement in fuel efficiency in such a way to mainly use battery power in a fuel consumption section other than a deceleration section and increase a power generation load to increase an amount of electric power for charging the battery in the deceleration section.

However, the alternator, which is the target to be controlled in the power generation control method, may have different driving efficiencies for each manufacturer, model, and operation temperature. For the present reason, since the same driving torque map is used based on a single control factor including voltage change even though alternators have different driving torque maps, the power generation control method may not reflect a difference in efficiency of the alternator.

Hence, in the power generation control method, the alternator may not be efficiently used under an optimal condition to improve battery charge and discharge performance and fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

An exemplary embodiment of the present invention is directed to providing a method of intelligently controlling power generation based on an efficiency map, configured for further improving battery charge and discharge performance and fuel efficiency according to the optimized performance of an alternator by establishing an efficiency map using a load map and a driving torque map based on efficiency data for each alternator and efficiency variation data for each operation condition (temperature, load, or speed), and combining high-efficiency point voltage change speed control based on the load map and voltage change speed control based on the driving torque map using power generation control factors including outdoor temperature, and a vehicle using the same.

Various aspects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method of intelligently controlling power generation based on an efficiency map includes steps of (A) determining whether a condition for performing power generation control of an alternator by a controller while a vehicle travels is satisfied, (B) detecting a battery SOC, an alternator temperature, an alternator speed, an engine RPM (Revolutions Per Minute), a coolant temperature, and an outdoor temperature when the condition for performing power generation control is satisfied, (C) selecting a load map and a driving torque map of the alternator according to the outdoor temperature, and detecting a high-efficiency point matched with the alternator temperature in the load map, (D) performing a high-efficiency point voltage change speed control mode based on the load map when the high-efficiency point is detected, (E) detecting an execution condition of the power generation control when the high-efficiency point is not detected, and (F) performing a voltage change speed control mode based on the driving torque map when the execution condition of the power generation control is detected.

The power generation control may be performed when a traveling pattern of the vehicle is not changed, when the voltage of the alternator is not excessively changed in a state in which the traveling pattern of the vehicle is changed, or after a triggering is determined and a holding time is given in a state in which the traveling pattern of the vehicle is changed and the voltage of the alternator is excessively changed.

In the high-efficiency point voltage change speed control mode, the voltage of the alternator may be controlled along the high-efficiency point line of the load map. In the voltage change speed control mode, the voltage of the alternator may be controlled along the driving torque of the driving torque map.

The execution condition of the power generation control may be when it is necessary to charge the battery in low and high load regions of the engine and in a section of deviating from a low speed.

The load map and the driving torque map may be established by setting the range of the outdoor temperature, in which the alternator is exposed, as a temperature of −30° C. to 100° C., the high-efficiency point line connecting high-efficiency points for each operation temperature of the alternator may be indicated in a current-speed diagram of the load map, and the driving torque of the alternator may be indicated in a current-speed diagram of the driving torque map.

In accordance with another exemplary embodiment of the present invention, a vehicle includes a power generation control system connected to a battery sensor for detecting an SOC of a battery, a coolant temperature sensor for detecting a coolant temperature of an engine, and an engine speed sensor for detecting the RPM of the engine, and includes a controller for differently performing voltage change speed control of an alternator based on a load map, in which a high-efficiency point line connecting high-efficiency points for each operation temperature is indicated, and a driving torque map in which a driving torque is indicated.

Each of the load map and the driving torque map may be based on a current-speed diagram, and may be established by a standardized efficiency measurement method for each temperature of the alternator in an outdoor temperature at which a temperature of −30° C. to 100° C. is set to be in an operation temperature range of the alternator.

The methods and apparatuses of the present invention have other features and advantages which will be apparent from or are set forth in more detail in the accompanying drawings, which are incorporated herein, and the following Detailed Description, which together server to explain certain principles of the present invention.

BRIEF DESCRIPTION OF THE DRAWINGS

FIG. 2 is a diagram illustrating an example of a vehicle using the method of intelligently controlling power generation based on an efficiency map according to an exemplary embodiment of the present invention.

FIG. 3 is a diagram illustrating an example of an efficiency map for high-efficiency point voltage change speed control of an alternator according to an exemplary embodiment of the present invention.

Figure 1A:
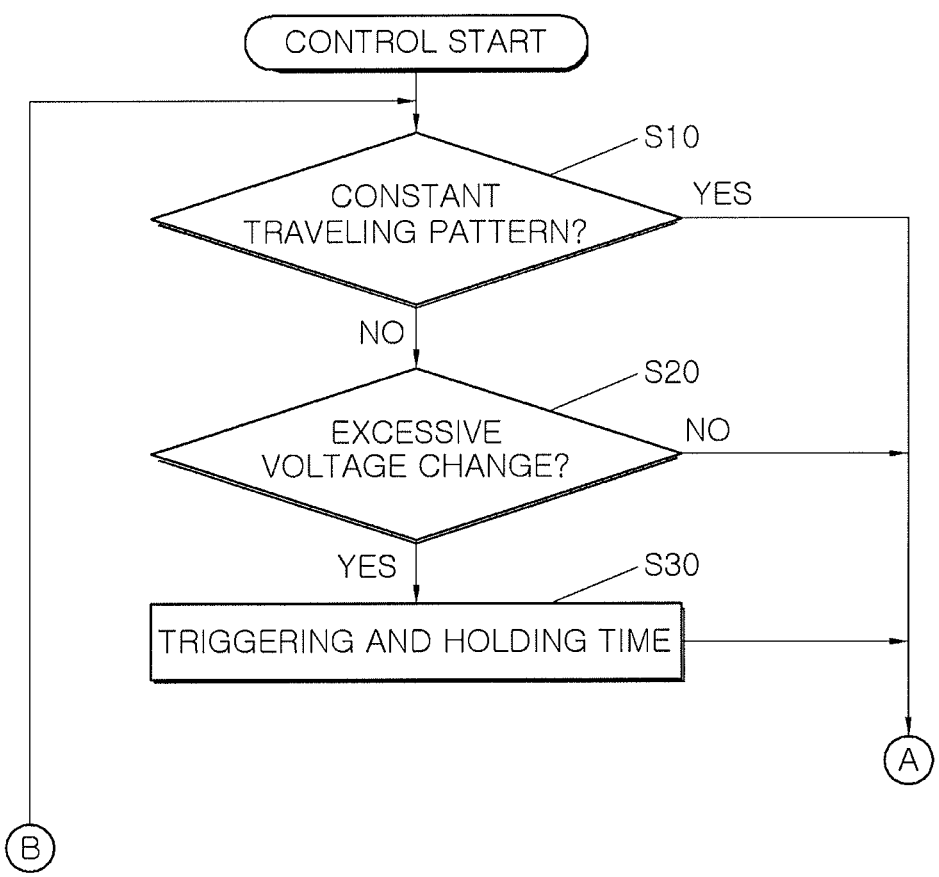
FIG. 1A and FIG. 1B are a flowchart illustrating a method of intelligently controlling power generation based on an efficiency map according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1B:
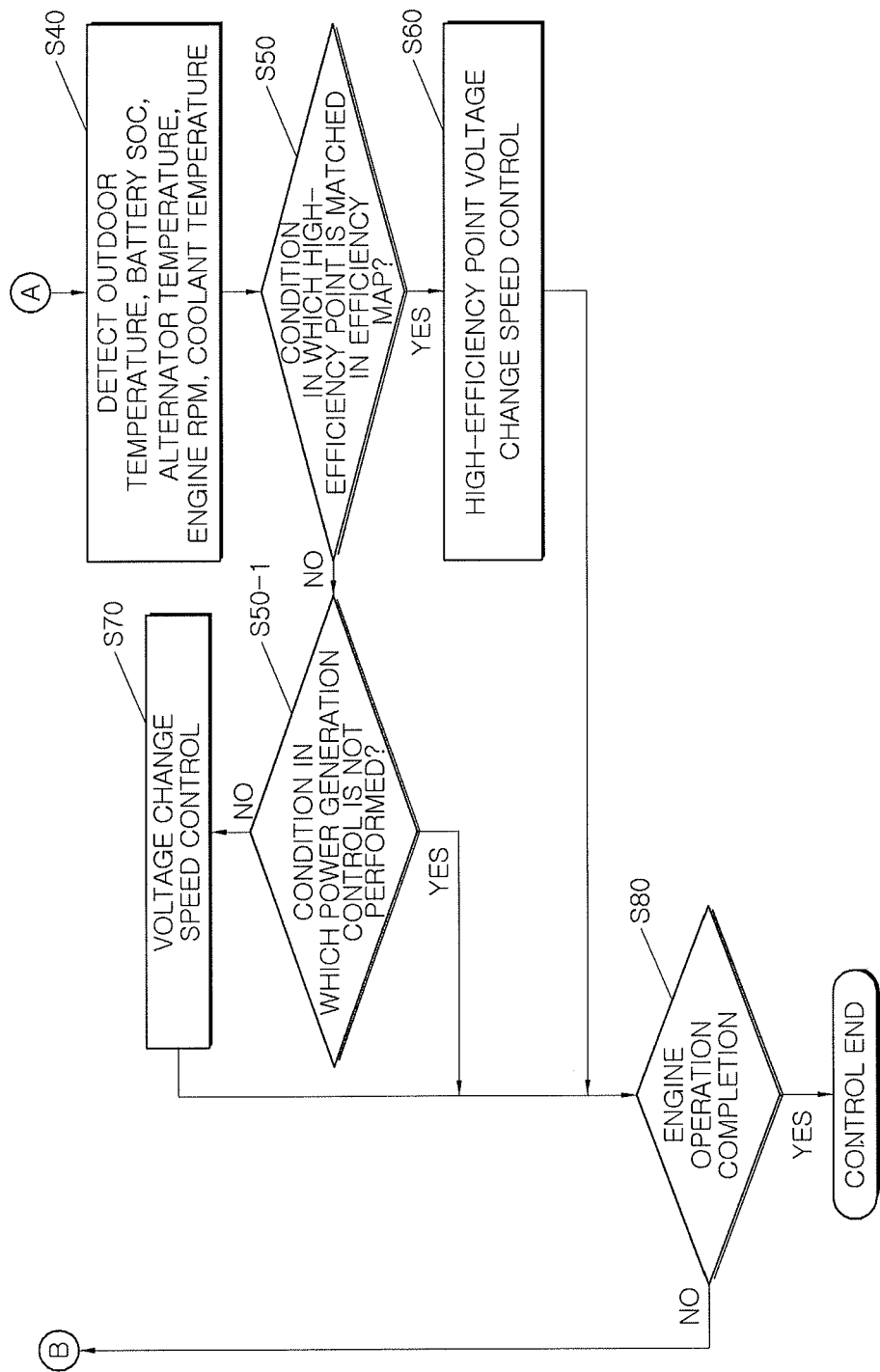

Referring to FIG. 1A and FIG. 1B, in a method of intelligently controlling power generation based on an efficiency map, a voltage change speed control mode S40 is changed to a high-efficiency point voltage change speed control mode S70 under the conditions of a battery SOC, an alternator temperature, and an engine RPM when a vehicle travels, and an efficiency map, which is established by a load map and a driving torque map based on efficiency variation data determined by correcting the efficiency data of different alternators for each manufacturer, model, and operation temperature under the conditions of temperature, load, and speed, is applied to the high-efficiency point voltage change speed control mode.

As a result, the power generation method may improve battery charge and discharge performance and fuel efficiency by optimally utilizing the efficiency of the alternator.

Hereinafter, the method of intelligently controlling power generation based on an efficiency map will be described in detail with reference to FIG. 2 through FIG. 6.

Referring to FIG. 2, in the method of intelligently controlling power generation based on an efficiency map, the target to be controlled is a power generation control system 10 of a vehicle 1, and the control subject is a controller 50 connected to an efficiency map 50-1. The power generation control system 10 includes an alternator 20, a battery 30, a battery sensor 40-1, a coolant temperature sensor 40-2, an engine speed sensor 40-3, and a controller 50. The battery sensor 40-1 is configured to detect the SOC of the battery 30 and transmits the detected SOC to the controller 50. The coolant temperature sensor 40-2 is configured to detect the coolant temperature of the engine and transmits the detected coolant temperature to the controller 50. The engine speed sensor 40-3 is configured to detect the RPM of the engine and transmits the detected RPM to the controller 50. The controller 50 receives signals from the sensors 40-1, 40-2, and 40-3 and treats the temperature/speed/driving torque of the alternator, an engine load, a vehicle speed, etc as input data. The efficiency map 50-1 is configured by a load map 50-1A, which is determined by temperature load maps 50-1a, 50-1b, and 50-1c for each operation temperature of the alternator, and a driving torque map 50-1B, which determined by driving torques for each operation temperature of the alternator, in outdoor temperature determined by a standardized efficiency measurement method for each temperature.

Therefore, each of the controller 50 and the efficiency map 50-1 may be an engine Electronic Control Unit (ECU), a motor Control Unit (MCU), or a hybrid Control Unit (HCU).

S10 is a step of determining the constant traveling pattern of the vehicle 1 by the controller 50. S20 is a step of determining whether the voltage of the alternator 20 is excessively changed by the controller 50. S30 is a step of determining the triggering (the voltage change induction) of the alternator 20 and giving a holding time by the controller 50.

Referring to FIG. 2, the controller 50 receives the SOC of the battery 30 detected by the battery sensor 40-1, the coolant temperature detected by the coolant temperature sensor 40-2, and the engine RPM detected by the engine speed sensor 40-3 to check the state of the traveling vehicle 1. Therefore, a traveling pattern change (e.g. acceleration, deceleration, or traveling at constant speed), which causes the excessive voltage change of the alternator 20, is determined from the increase or decrease of the engine RPM.

As a result, the process may proceed to a power generation mode condition factor detection step (S40) in the condition in which the controller 50 does not determine the traveling pattern change in step S10 or does not determine whether the voltage of the alternator 20 is excessively changed depending on the traveling pattern change in step S20. On the other hand, when the controller 50 determines the traveling pattern change in step S10, the process may proceed to step S20. When the controller 50 determines whether the voltage of the alternator 20 is excessively changed depending on the traveling pattern change in step S20, the process may proceed to step S30. Next, the process may proceed to the power generation mode condition factor detection step (S40) in the condition in which the holding time for triggering causing the excessive voltage change of the alternator 20 depending on the traveling pattern change is given in step S30. Here, the holding time is a time required to uniformly maintain the voltage of the alternator 20 without the rapid change thereof, i.e., not more than a predetermined rate, and is the same time as being applied to existing power generation control.

S40 is a step of detecting a power generation mode condition factor for selecting a power generation mode by the controller 50. S50 is a step of determining whether a load map 50-1A is applied by the controller 50. S50-1 is a step of determining whether power generation is not performed for application of a driving torque map 50-1B by the controller 50.

Referring to FIG. 2 and FIG. 3, the controller 50 applies an outdoor temperature, a battery SOC, an alternator temperature, an alternator speed, an engine RPM, and a coolant temperature as power generation control condition factors. As a result, the controller 50 matches the high-efficiency points of the alternator for each outdoor temperature from the efficiency map using the engine RPM and alternator temperature of the power generation control condition factors detected in step S50, so that the mode may be changed to a high-efficiency point voltage change speed control mode in step S60. In addition, the mode may be changed to a voltage change speed control mode in step S70 using the SOC of the power generation control condition factors detected in step S50-1, except for a section, in which power generation is not performed, including the low load region of the engine and the high load/low speed region of the engine, in which the efficiency of the alternator 20 is poor.

S60 is a step of performing the high-efficiency point voltage change speed control mode by the controller 50.

Figure 6:
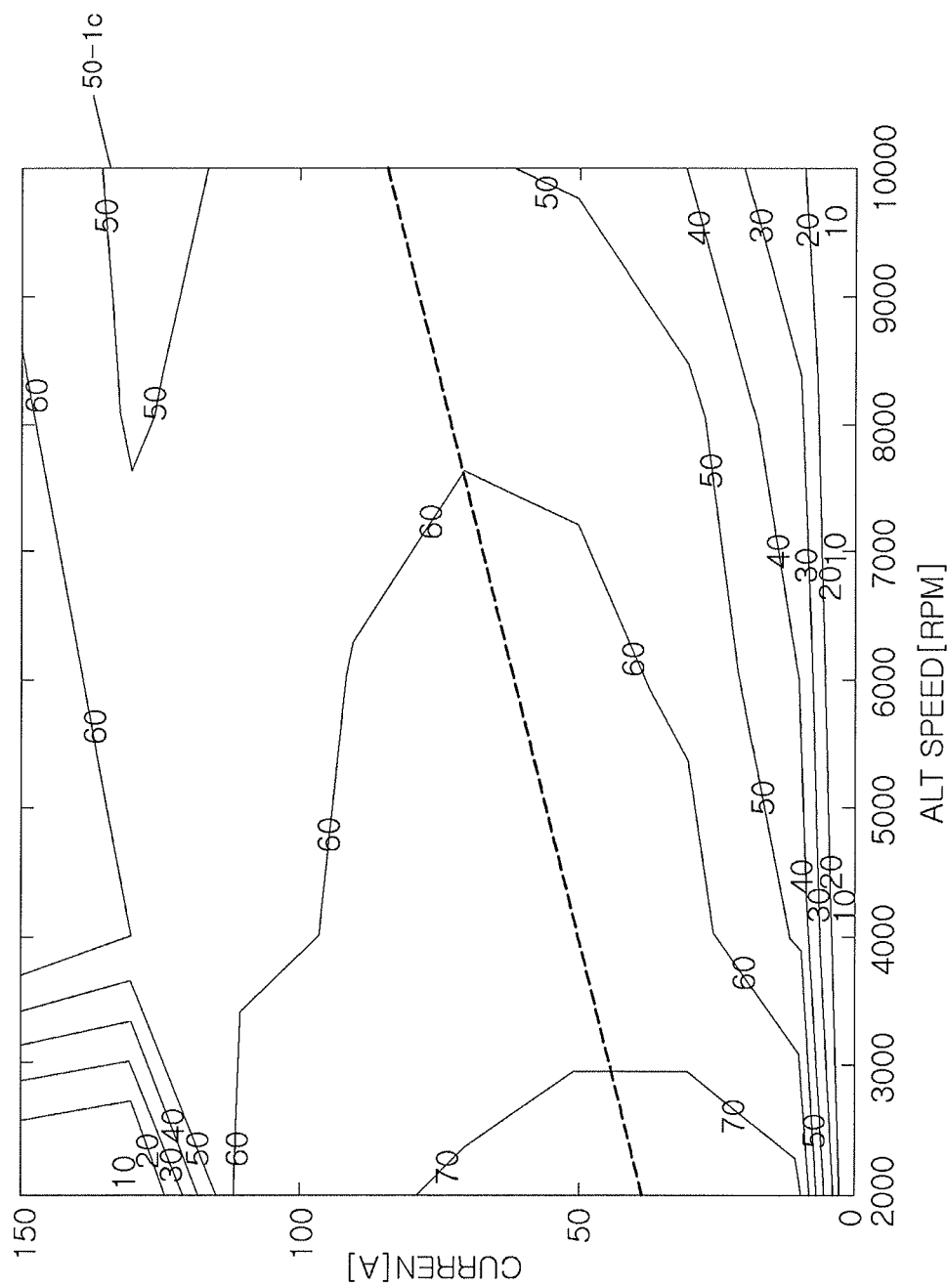

Referring to FIG. 3, and FIG. 4 through FIG. 6, the load map 50-1A of the efficiency map 50-1 is classified into a low-temperature load map 50-1a at −30° C. (FIG. 4), a room-temperature load map 50-1b at 20° C. (FIG. 5), and a high-temperature load map 50-1c at 100° C. (FIG. 6). A high-efficiency point line (indicated by the broken line) indicative of a high-efficiency point is indicated in each of the low-temperature load map 50-1a, the room-temperature load map 50-1b, and the high-temperature load map 50-1c. The high-efficiency point line is determined by a standardized efficiency measurement method for each temperature.

Figure 4:
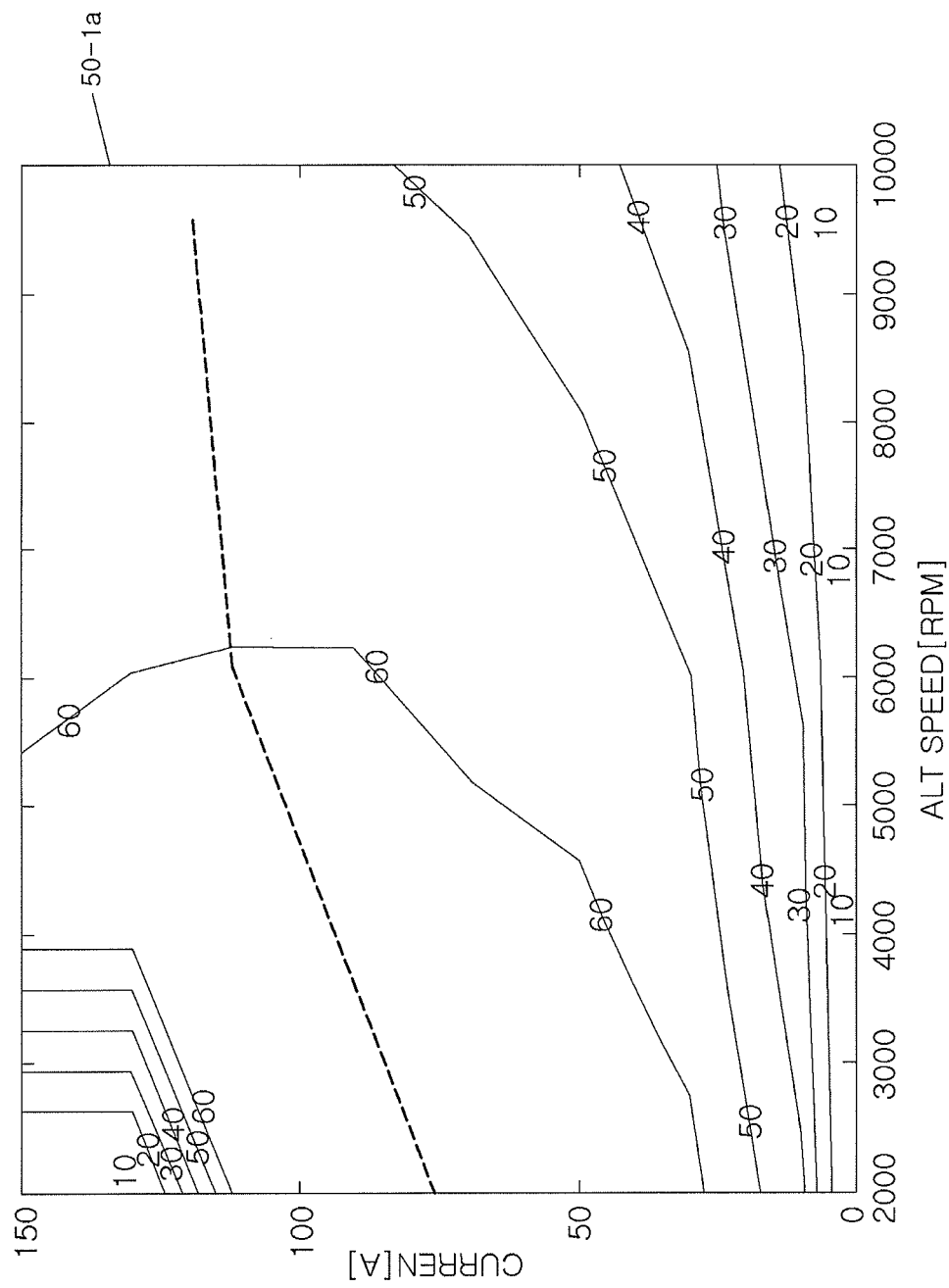
FIG. 4, FIG. 5, and FIG. 6 are graphs illustrating an example of high-efficiency points of the alternator for each load applied to the high-efficiency point voltage change speed control according to an exemplary embodiment of the present invention.
Figure 5:
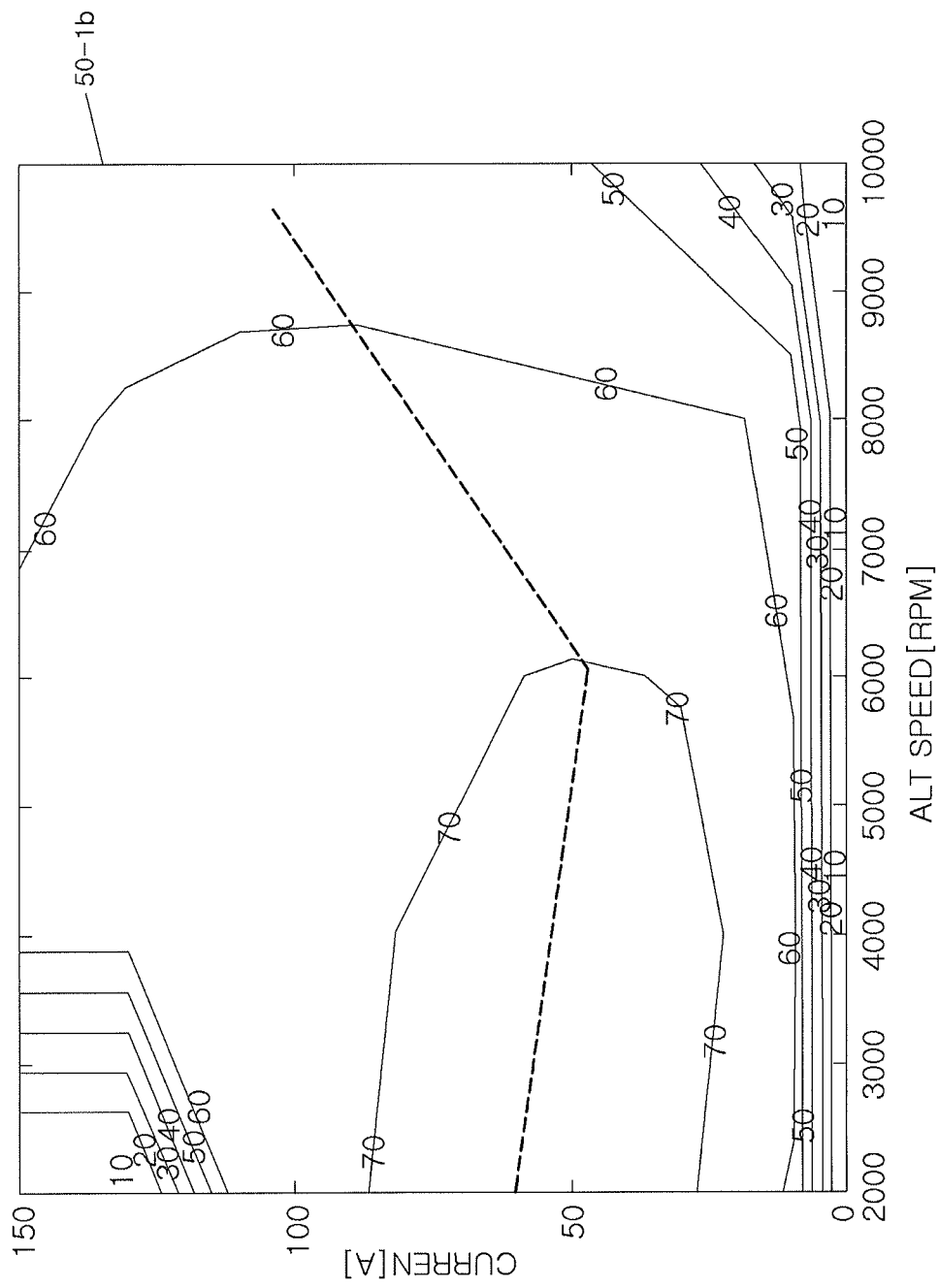

For example, referring to FIG. 4 of the low-temperature load map 50-1a at −30° C., the operation temperatures of the alternator, which are separated in the diagram of alternator current-alternator speed, are connected to the high-efficiency point line (indicated by the broken line). In the high-efficiency point line (indicated by the broken line), the alternator currents are optimally matched with the alternator speeds, respectively. Therefore, the controller 50 performs voltage change speed control along the high-efficiency points of the high-efficiency point line (indicated by the broken line) in the condition of outdoor temperature of −30° C. In the high-efficiency point voltage change speed control mode, the power generation control is performed using the load map 50-1A matched with outdoor temperature.

S70 is a step of performing a voltage change speed control mode by the controller 50.

Referring to FIG. 3, the driving torque map 50-1B of the efficiency map 50-1 matches with the outdoor temperature of −30° C., 20° C., or 100° C. For example, the optimal driving torques of the alternator are separated in the diagram of alternator current-alternator speed of the driving torque map 50-1B at −30° C. The alternator currents are matched with the alternator speeds, respectively by the optimal driving torques of the alternator. Therefore, the controller 50 performs voltage change speed control along the optimal driving torques of the alternator in the condition of outdoor temperature of −30° C. In the voltage change speed control mode, the power generation control is performed using the driving torque map 50-1B matched with outdoor temperature. In the present case, the voltage change speed control mode is equal to an existing mode except for using the driving torque map 50-1B classified for each outdoor temperature.

S80 is a step of completing the power generation control by the controller 50. To the present end, the controller 50 is configured to check whether the engine is turned off, and initiates the engine after the power generation control is completed when the engine is turned off.

As described above, the method of intelligently controlling power generation based on an efficiency map according to the exemplary embodiment of the present invention can improve battery charge and discharge performance and fuel efficiency even in the efficiency condition of alternators which are different for each manufacturer, model, and operation temperature, by selecting the high-efficiency point voltage change speed control mode using the load map established by the current-speed diagram in which the high-efficiency point line connecting the high-efficiency points for each operation temperature of the alternator is indicated or the voltage change speed control mode using the driving torque map established by the current-speed diagram in which the driving torque of the alternator is indicated, after the power generation control of the alternator is performed by the controller while the vehicle travels.

An intelligent power generation control according to exemplary embodiments of the present invention has the following advantages and effects by application of an efficiency map.

First, it is possible to intelligently improve the technique for power generation control of an alternator by adding high-efficiency point voltage change speed control together with voltage change speed control. Secondly, since the high-efficiency point voltage change speed control is performed based on efficiency variation data according to an SOC, an alternator speed, an engine RPM, and a coolant temperature, it is possible to further improve battery charge and discharge performance and fuel efficiency by the optimized efficiency of the alternator. Thirdly, it is possible to prevent power generation from being performed in a low load region and a high load/low speed region, in which efficiency is poor, after the SOC is detected, by the high-efficiency point voltage change speed control. Fourthly, it is possible to establish a power generation strategy under an optimal condition for improvement in fuel efficiency and battery charge and discharge performance even though the efficiencies and driving torques of the alternator are different for each temperature, manufacturer, and model. Fifthly, it is possible to standardize the performance of alternators which are different for each manufacturer and model. For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of intelligently controlling power generation based on an efficiency map, comprising:
    performing a power generation control selection mode in which voltage change speed control is performed based on a load map or a driving torque map of an alternator after power generation control of the alternator is performed by a controller while a vehicle travels,
    wherein in the power generation control selection mode, after the power generation control is performed, a battery State of Charge (SOC), an alternator temperature, an alternator speed, an engine RPM, a coolant temperature, and an outdoor temperature are detected as power generation control mode condition factors;
    wherein a high-efficiency point matched with the alternator temperature is detected according to the outdoor temperature in the load map, and when the high-efficiency point is detected, a high-efficiency point voltage change speed control mode is performed; and
    wherein when the high-efficiency point is not detected, a voltage change speed control mode is performed in an execution condition of the power generation control.

2. The method of claim 1, wherein the power generation control is performed when a traveling pattern of the vehicle is not changed.

3. The method of claim 1, wherein the power generation control is performed when a voltage of the alternator is not changed more than a predetermined amount in a state in which a traveling pattern of the vehicle is changed.

4. The method of claim 1, wherein the power generation control is performed after a triggering is determined and a holding time is given in a state in which a traveling pattern of the vehicle is changed and a voltage of the alternator is changed more than a predetermined amount.

5. The method of claim 4, wherein the holding time is a time required to uniformly maintain the voltage of the alternator without change of more than a predetermined rate thereof.

6. The method of claim 1, wherein in the high-efficiency point voltage change speed control mode, a voltage of the alternator is configured to be controlled along a high-efficiency point line of the load map.

7. The method of claim 1, wherein in the voltage change speed control mode, a voltage of the alternator is configured to be controlled along a driving torque of the driving torque map.

8. The method of claim 1, wherein the execution condition of the power generation control is when it is necessary to charge a battery in low and high load regions of an engine and in a section of deviating from a speed lower than a predetermined amount.

9. The method of claim 1, wherein the load map and the driving torque map are matched for each section of the outdoor temperature, to which the alternator is exposed.

10. The method of claim 9, wherein a high-efficiency point line connecting high-efficiency points for each operation temperature of the alternator is indicated in a current-speed diagram of the load map, and a driving torque of the alternator is indicated in a current-speed diagram of the driving torque map.

11. A vehicle comprising:
    a power generation control system connected to a battery sensor for detecting a battery State of Charge (SOC), a coolant temperature sensor for detecting a coolant temperature of an engine, and an engine speed sensor for detecting an engine RPM, and comprising a controller,
    wherein the controller is configured of performing a power generation control selection mode in which voltage change speed control is performed based on a load map or a driving torque map of an alternator after power generation control of the alternator is performed by the controller while a vehicle travels,
    wherein in the power generation control selection mode, after the rower generation control is performed, the battery SOC, an alternator temperature, an alternator speed, the engine RPM, the coolant temperature, and an outdoor temperature are detected as power generation control mode condition factors,
    wherein a high-efficiertgy point matched with the alternator temperature is detected according to the outdoor temperature in the load map, and when the high-efficiency point is detected, a high-efficiencv point voltage change weed control mode is performed, and
    wherein when the high-efficiency point is not detected, a voltage change speed control mode is performed in an execution condition of the power generation control.

12. The vehicle of claim 11,
    wherein the controller is configured for differently performing the voltage change speed control of the alternator based on the load map, in which a high-efficiency point line connecting high-efficiency points for each operation temperature is indicated, and the driving torque map in which a driving torque is indicated, and
    wherein the controller is connected to the battery sensor, the coolant temperature sensor, and the engine speed sensor to perform the power generation control.

13. The vehicle of claim 12, wherein each of the load map and the driving torque map is based on a current-speed diagram, and is established by a standardized efficiency measurement method for each temperature of the alternator in the outdoor temperature at which a temperature of −30° C. to 100° C. is set to be in an operation temperature range of the alternator.

14. The vehicle of claim 12, wherein each of the controller, the load map and the driving torque map is one of an engine Electronic Control Unit (ECU), a Motor Control Unit (MCU), and a Hybrid Control Unit (HCU).

\* \* \* \* \*